United States Patent [19]

Molinier et al.

[11] 4,246,145

[45] Jan. 20, 1981

[54] AQUEOUS SIZE FOR GLASS FIBERS

[75] Inventors: Jacques Molinier, La Motte Servolex; Jacques Mahler, Chambery; Gilbert Bocquet, Challes les Eaux; Bernard de Massey, Chambery, all of France

[73] Assignee: Saint-Gobain Industries, Neuilly-sur-Seine, France

[21] Appl. No.: 870,508

[22] Filed: Jan. 18, 1978

[30] Foreign Application Priority Data

Jan. 19, 1977 [FR] France .................. 77 01386

[51] Int. Cl.$^3$ ............ C08L 89/04; C08L 83/08; C08L 63/10; C08L 33/26
[52] U.S. Cl. ................... 260/7.5; 65/3 C; 260/6; 260/8; 260/29.2 EP; 260/29.2 M; 260/29.6 NR; 525/102; 525/113; 428/391
[58] Field of Search ............ 65/3 C; 428/391; 260/29.2 JN, 29.2 N, 29.2 NR, 29.2 EP, 8, 7.5, 6

[56] References Cited

U.S. PATENT DOCUMENTS

| | | |
|---|---|---|
| 3,097,963 | 7/1963 | Caroselli et al. |
| 3,207,623 | 9/1965 | Marzocchi et al. |
| 3,249,411 | 5/1966 | McWilliams et al. ............ 65/3 C |
| 3,252,278 | 5/1966 | Marzocchi et al. |
| 3,252,825 | 5/1966 | Marzocchi |
| 3,265,516 | 8/1966 | Triplett et al. ............... 106/213 |
| 3,284,179 | 11/1966 | Eilerman ..................... 63/3 C |
| 3,341,356 | 9/1967 | Collier |
| 3,734,763 | 5/1973 | Pleuddemann |
| 3,746,738 | 7/1973 | Pepe et al. ................. 260/33.25 B |
| 3,775,074 | 11/1973 | Russell ........................... 65/2 |
| 3,803,069 | 4/1974 | McWilliams et al. ............ 65/3 C |
| 3,814,592 | 6/1974 | McWilliams et al. ............ 65/3 C |
| 3,819,675 | 6/1974 | Pleuddemann ............ 260/448.8 R |
| 3,869,308 | 3/1975 | Graham ......................... 65/3 C |
| 3,884,886 | 5/1975 | Pleuddemann ............ 260/448.8 R |
| 3,936,285 | 2/1976 | Maaghul ....................... 65/3 C |
| 3,944,707 | 3/1976 | Foley et al. .................. 428/391 |
| 3,946,131 | 3/1976 | Biefeld et al. ................ 428/391 |
| 3,946,132 | 3/1976 | Hedden ....................... 428/391 |
| 3,997,306 | 12/1976 | Hedden ........................ 65/3 C |
| 4,014,726 | 3/1977 | Fargo ........................... 65/3 C |
| 4,039,716 | 8/1977 | Johnson ....................... 428/391 |
| 4,056,651 | 11/1977 | Scola .......................... 428/391 |

FOREIGN PATENT DOCUMENTS

| | | |
|---|---|---|
| 2205523 | 5/1974 | Fed. Rep. of Germany . |
| 1391278 | 1/1965 | France . |
| 2007727 | 1/1970 | France . |
| 2042658 | 2/1971 | France . |
| 2140130 | 1/1973 | France . |
| 2148505 | 3/1973 | France . |
| 2167771 | 8/1973 | France . |
| 2187713 | 1/1974 | France . |
| 2259127 | 8/1975 | France . |
| 2285352 | 4/1976 | France . |
| 2286800 | 4/1976 | France . |
| 1346270 | 2/1974 | United Kingdom . |
| 1364965 | 8/1974 | United Kingdom . |

Primary Examiner—Wilbert J. Briggs, Sr.
Assistant Examiner—A. H. Koeckert
Attorney, Agent, or Firm—John T. Synnestvedt

[57] ABSTRACT

A glass fiber sizing composition for the reinforcement of resin matrices which comprises one or more adhesive agents, non-ionic lubricants, organo-silanes, and cationic lubricants as well as a coadhesive such as gelatin, another silane or some sort of glass-resin binding agent and demineralized water as a complement. The organo-silanes are from the group comprising the organo-silanes containing an organic chain of the polyazamide type and the organo-silanes whose organic chain contains at least one phenyl radical and at least two secondary or tertiary amine groups. The addition of the organo-silanes to the sizing composition improves the tensile strength of the sized strands. These organo-silanes are good organic glass-resin binding agents and their presence decreases the risk of rupture of the strands during the winding operation.

7 Claims, No Drawings

AQUEOUS SIZE FOR GLASS FIBERS

The present invention concerns aqueous compositions for coating glass fibers to be used particularly for reenforcing thermoset or thermoplastic synthetic resins. It also concerns both a method for fabricating glass fibers with great tensile strength, in which method these aqueous compositions are applied to the fibers, and the obtained fibers.

The glass fibers are fabricated in a known manner through the attenuation of molten glass threads flowing from die orifices. These glass threads are thinned down in order to form continuous filaments by means of an attenuation carried out by the winding of the filaments, after being gathered in the form of a strand, on a support borne by a winder turning at great speed. Before being gathered in the form of a strand, the filaments are coated with a sizing by being passed over a continuously fed sizing component.

The sizing is applied for the purpose of preventing the mutual abrasion and the rupturing of the individual filaments when the strand is submitted to a certain number of transformations during its fabrication or utilization. Particularly, if the strand must undergo certain textile operations, such as twisting, cabling, warping, pirn winding or weaving, before being incorporated with the organic resins to be reenforced, it is necessary for it to be coated with a coating with good protective and lubricating properties so that the strand can support friction during its speedy passage through guide elements. The sizing must also establish an adhesion or sufficient cohesion of the filaments to each other so as to give the strand integrity. The protective anti-abrasion property and unity are essential when the strand undergoes all the aforementioned textile transformation operations.

In another connection, where the strands or webs are used for the reenforcement of plastic materials, the sizing must be compatible with the matrices to be reenforced and must improve the adhesion of the strands to these matrices so that laminations with good mechanical and dielectrical properties are obtained. Generally the sizing is a solution or an aqueous dispersion composed essentially of one or several adhesive or film forming agents, contributing to the integrity of the strands; of lubricants, for protecting the filaments and strands against abrasion; and possibly of binding agents favoring adhesion of the filaments to the organic matrices to be reenforced.

Various additives, such as products stabilizing the emulsions, antistatic products, fungicides or softening agents, can also be added to these sizing compositions, depending on the ultimate range of applications of the strands.

The sized strands can be used in the form of cut strands and are in this case directly submitted to a cutting operation after fiberization or after the formation of the assemblies (union of parallel strands without twisting); these cut strands are then incorporated with the thermoplastic or thermoset synthetic resins. The strands can also be used in the form of twisted or untwisted, continuous strands and can be used for textiles as well as for the reenforcement of the said resins.

The present invention relates particularly to sizings permitting fabrication of strands capable of supporting the strains to which they are submitted during their transformations or ulterior utilizations such as twisting, cabling, sectional warping, weaving, wrapping, braiding, filament winding or cutting. The sizings according to the invention are conducive to strands displaying not only strong unity and good adhesion to the matrices to be reenforced, but they also allow for a considerable decrease in the number of filament ruptures and for an improvement in the yields during these transformations operations.

The invention relates to compositions containing, in addition to the usual basic ingredients for coating glass fibers, at least one component from an organosilane family, the formula for which is given hereafter, one particular characteristic of which is that it considerably increases the tensile strength of the strands without affecting their other properties, particularly their behavior during textile operations.

In order to coat glass fibers to be used in the form of continuous strands, for reenforcing plastic materials, it is well known to use aqueous sizings containing:
adhesive agents such as polyvinyl acetate, acrylic resins, polyesters, epoxy resins, polyurethanes;
lubricating agents;
and at least one component of the organo-silane type.

This organo-silane component serves as a binding or bridging agent of the glass to the organic resins and thus assures compatibility of the glass fibers with the resins to be reenforced. However, the organo-silanes used most often in these sizings, such as α-aminopropyltriethoxysilane, vinyltriacetoxysilane, N-β-amino-ethyl-α-amino-propyltrimethoxysilane, -methacryloxypropyl-trimethoxysilane, phenyltrimethoxysilane, vinyl-tri-(β-methoxyethoxysilane), practically do not improve the tensile strength of the sized strands and only provide them with the property of good adhesion to the matrices to be reenforced. The same holds true for other prior art organo-silanes which are more rarely used, such as polyaminopropyl-trimethoxysilane or β-(3,4-epoxy cyclohexyl) ethyl-tri-methoxysilane, or paraaminophenyltrihydroxysilane. In another case, when strands coated with these known sizings are first woven so as to then be used in the form of webs for the reenforcement of plastic materials, the various components of the incorporated organo-silane type do not allow for obtaining strands possessing, integrity sliding ability and tensile strength strong enough for the twisting, winding on a warp beam and weaving operations to be carried out without filament rupture or other difficulties. These conditions thus considerably decrease the yields from the operations and also the quality of the webs.

For this application, the publication of French Pat. No. 2,259,127 also proposed aqueous sizings containing a partially baked starch, a parafin wax, an emulsifier, a cationic lubricant and organo-silane of the formula:

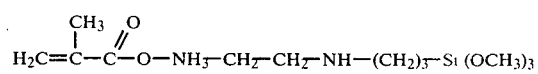

However, the preceding compositions seems to be the only one giving strands leading to satisfactory results during textile operations. In fact, it is specifically stated that replacing this organo-silane with another silane such α-methacryloxypropyltrimethoxy-silane totally destroys the ability of the strands to withstand these textile operations. In addition, the addition of this organo-silane type of component to the sizings does not seem to improve the tensile strength of the strand in contrast to the use of particularly active organo-silanes as proposed by the invention.

According to the present invention, the addition to the sizing for glass fibers of one or several specific silanes comprising the group defined hereafter surprisingly improves the tensile strength of the sized strands, this improvement being generally in an amount of 20 to 60% depending on the types of strands and the sizing components; this takes place without any effect on the other properties of these strands.

The aqueous compositions forming objects of the invention essentially contain the following elements, the rates for which are expressed throughout the description in weight parts of active materials per 100 parts of the total:

0.5 to 15% of adhesive agent(s), 0.1 to 2% of at least one organo-silane from the group comprised of the organo-silanes containing an organic chain of the polyazamide type and of the organo-silanes, the organic chain of which contains at least one phenyl radical and at least two secondary or tertiary amine groups, 0 to 7% of lubricant(s), 0 to 2% of another silane or a glass-resin binding agent of some sort.

complement: demineralized water.

The proposed organo-silanes with a polyazamide type of organic chain have the following formula:

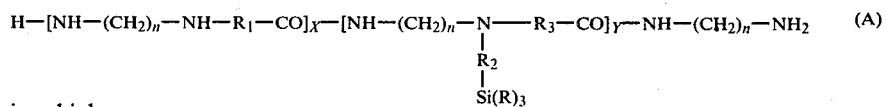

in which:

x/y is 0.5 to 15; n is 2 to 6 and preferably n=2 or 3.

R is a methoxy, ethoxy, propoxy, n-butoxy or β-methoxyethoxy radical.

$R_1$ and $R_3$ are divalent alkylene radicals containing 1 to 3 carbon atoms.

$R_2$ represents a substituted or non-substituted divalent cycloaliphatic, aromatic or aliphatic radical.

The various methods for fabrication of these components, the nature of the radicals and the values of x and y as a function of the method used are described in detail in U.S. Pat. No. 3,746,738.

Organo-silanes whose organic chain encompasses at least one phenyl radical and at least two secondary or tertiary amine groups reacting substantially on the tensile strength of the sized strands have the following formulas:

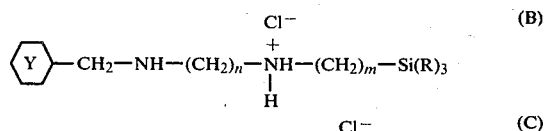

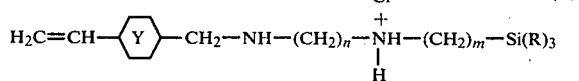

in which:

n is 2 to 6, preferably n=2 or 3 m is 1 to 10, preferably m is 1 to 4

R is a methoxy, ethoxy, propoxy, n-butoxy or β-methoxyethoxy radical.

The unexpected gain in the tensile strength of strands because of the addition of at least one of the proposed organo-silanes is obtained independently of the constituents forming the basis of the sizing, notwithstanding the different nature of these constituents, depending on the ulterior use of the strands, on the direct reinforcement of the plastic materials or on the intermediary textile transformations such as weaving. In addition, this gain in tensile strength is not accompanied by any destruction of the properties, such as the integrity, the appearance of the strands, their adhesion to the matrices to be reinforced, their resistance to abrasion, their ability to withstand the latter operations for their ulterior uses or for their textile transformations—properties which vary of course depending on the various sizing compositions used.

There is a considerable, surprising and particularly interesting advantage to be noted when the strands are submitted to friction strains and substantial tensions, particularly during the textile transformation operations. It was observed, in fact, that the strands sized with the compositions forming the objects of the invention undergo these operations with a decrease of the number of filament ruptures, of the quantity of hairs, or of the tangling of the strands during their passage through guide components. This reduction of the number of breaks during twisting, warping or weaving permits operations at higher speeds, consequently leading to improvements in the fabrication yields. These improvements also permit obtaining webs having a better appearance and possessing, as do the strands or the assemblies of strands which are used for their formation, better tensile strength.

In addition to the considerable increase in the tensile strength of the strands brought about by the introduction into the sizings of the organo-silanes defined by the invention, it is important to emphasize that these organo-silanes have the property of being good organic glass-resin binding agents and assure the cohesion of the matrix to be reenforced and the strands or the webs. The two properties, that is the increase in the tensile strength and the good organic glass-resin bond, are thus both present with these organo-silanes contrary to what happens with the standard silanes known and used up to the present as binding agents of glass and resins to be reenforced. Because of the fact that the same organo-silane component performs two functions at the same time, the sizings for strands to be used for the reenforcement of organic resins contain, according to the invention, besides the usual adhesive agents, at least one organo-silane from the group defined hereabove in place of the organo-silane usually used as organic glass-resin binding agent. It is, however, possible to use in these sizings a mixture of standard organosilanes from prior art and organo-silanes having the property of increasing the tensile strength of the strands.

Among the sizings forming objects of the invention, the preferred compositions are the following (expressed in parts by weight of active materials per 100 parts of sizing):

1 to 10% of at least one adhesive agent, such as an acrylic polymer, a polyvinyl acetate, an epoxy resin, a polyester resin, a polyurethane;

0.05 to 5% of non-ionic lubricant(s), 0.1 to 2% of at least one organo-silane from the group comprised of the organo-silanes containing an organic chain of the polyazamide type and the organo-silanes whose organic chain contains at least one phenyl radical and at least two secondary or tertiary amine groups;
0 to 5% of cationic lubricant(s),
0 to 3% of coadhesive, such as gelatin,
0 to 2% of another silane or some sort of glass-resin binding agent.
complement: demineralized water.

Among the non-ionic lubricants generally used in such compositions, those that can be cited are, for example, polyethylene emulsions or non-ionic polyethylene glycol derivatives or oxyethylenated alkylphenols. Most often used as the cationic lubricant are condensates of fatty acids on polyethoxylated amino-alcohols, or amino derivatives of fatty bodies.

According to the present invention the organo-silanes from the group previously defined can even be introduced into the sizing compositions for strands, which, in the form of continuous assemblies or of strands coming directly from dies, are incorporated, for example, with epoxy, phenolic, vinyl-ester, or polyester resins according to a winding technique. In this case the adhesive agent contained in the sizing is preferably either a polyester resin, an epoxy resin or mixtures of the two depending on the nature of the organic mixture to be reenforced. Here again the presence of these organo-silanes is accompanied by a gain in the tensile strength of the gathered strands and decreases the risk of rupture of the strands during the winding operation on one hand and, on the other hand, permits obtaining a glass-resin bond at least as good as that obtained with the standard organo-silanes.

For the same reasons, it is advantageous to introduce at least one of these organo-silanes in the sizing compositions for strands which, in the form of assemblies, must be ultimately unwound at great speed so as to undergo a cutting operation. During this operation the above cited advantages are found, these advantages relative to the number of strand ruptures and to the yields resulting from the increased tensile strength of the strands.

The addition, to the sizings, of the organo-silanes defined by the present invention in proportions above the upper limit of 2% in weight brings no further improvement to the tensile strength of the strands and may elsewhere cause either a substantial modification of the stiffness of these strands or a decrease in the protection of the strand causing the appearance of broken filaments during the ulterior transformation operations.

Of course the use of these organo-silanes for the over-sizing or coating of strands having been preliminarily sized in the usual way displays similar advantages.

In the following examples, relating to a few methods of particular embodiments showing certain advantages of the invention, the tensile strength of the strands has been expressed independently of the area or of the size of these strands, that is in the form of stress. Each value corresponds to a mean established from several tests.

EXAMPLE 1

A sizing is prepared for strands in the form of webs to be used for reenforcing organic matrices. The composition for this sizing, expressed in parts by weight of active materials per 100 parts of sizing is the following:

| | % of active materials |
|---|---|
| adhesive agent: acrylonitrile, acrylamide and acrylic acid, acrylic copolymer in the respective proportions of 45%, 50%, 5% | 3.5 |
| co-adhesive agent: epoxy resin with a base of bisphenol A and epichlorhydrine (epoxy index 1.60 EG/kg), modified to 50% by diethanolamine in ethylene glycol monomethylic ether | 0.25 |
| non-ionic lubricant with a base of polyethylene glycol monolaurate 300, polyethylene glycol 600 dioleate and monoethylene glycol dioleate | 1.5 |
| organo-silane of general formula (C) with R = methoxy, n = 2, m = 3:  | 0.25 |
| demineralized water . . complement to | 100 |

The acrylic copolymer used has a pH of 7.8 in solution and, at a concentration of 41%, a viscosity of 3900 cPo, a viscosity measured by the Brookfield viscometer, speed 20, module 4 at 20° C.

For the first step a 5% solution of this partially neutralized acrylic copolymer is formed by adding triethanolamine to water at 15°-20° C. and adjusted to pH=5. The non-ionic lubricant, preliminarily diluted with 50% water and brought to a pH between 5 and 5.5, is incorporated with this solution. Elsewhere, the 10% epoxy resin solution at pH=5 is added to the preceding mixture.

In a second tank a hydrolysis of the silane is carried out by this silane being introduced into water brought to a pH=4 by acetic acid, the concentration of silane being below 3%. At the end of the hydrolysis, the pH is adjusted to a value of 4.7. The hydrolyzed silane is then added to the mixture of acrylic copolymer, lubricant and epoxy resin, the final pH being 5±0.2.

This sizing is applied at a temperature of 23° C. during the fiberization of standard glass by the means of sizing apparatus of the type with a belt. In this example the strand is formed by the union of 9 μm filaments coated with the preceding composition. The amount of dry sizing deposited on the strand is determined by loss by burning at 625° C. until a constant weight is attained; it rises to 0.65% with relation to the weight of the strand. The strand is submitted to a first twisting of 40 turns per meter and the tensile strength is measured in the known manner by the method described by B.I.S.-F.A. The strands having undergone a twisting of 20 or 40 turns per meter have a tensile strength of 206 kgf/mm² which, when compared to the values normally reached with standard sizing compositions such as in control example T hereafter, is considerably higher.

CONTROL EXAMPLE T

In order to demonstrate the increase in tensile strength attributed to the organo-silane contained in sizing example 1, by following the same operatory conditions as those above, a control composition is prepared containing the same basic components as in the preceding composition, but the organo-silane is replaced by one of the organo-silanes most currently used in the techniques, that being α-aminopropyl-triethoxysilane. Thus 0.25% of this silane is introduced into the standard composition which is applied to 9 μm filaments. The strand obtained possesses a dry sizing rate of 0.65% and displays, after undergoing an identical twisting of 20 or 40 turns per meter, a tensile strength of 142 kgf/mm$^2$.

A comparison of the values for the tensile strengths of the strands coated with the sizing of example T and the strands coated with the composition containing the silane from example 1 shows a gain of 46%, which clearly allows for an improvement in the properties of the obtained webs. In fact, textile operations are performed without any difficulties with the strands sized by means of the composition according to the invention, while these same textile operations had disturbances when the usual organo-silane such as that in example T was used. The characteristics of the webs produced in the two cases are collected in comparative table A and show a clear improvement as compared to the control.

The webs are directly incorporated, that is without a preliminary desizing, with the epoxy or polyester resins according to the usual methods. Laminations result the mechanical performances of which are improved in the case of the example according to the invention. These results are shown, in the same comparative table A, for laminations with a polyester resin base. Not only is the effectiveness of the organo-silane as a binding agent shown, but, also, its superiority relative to glass-resin adhesion, when compared with the usual organo-silane of example T.

of 184 kgf/mm$^2$ are obtained showing an improvement of 30% as compared with example T. The results with respect to the textile abilities are rather comparable with those of example 1; this formula permits, on the other hand, the achievement of good mechanical performances for laminations with an epoxy resin base.

EXAMPLE 3

A sizing is prepared according to the same operatory conditions and containing the same proportions of adhesive agents, co-adhesive and lubricant as in example 1, but for the silane a mixture including 0.1% of a silane of general formula (B) is used in which R=methoxy, n=2, m=3:

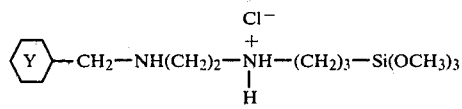

and including 0.15% of α-methacryloxypropyl-trimethoxysilane.

The sized strands, having a dry sizing rate of 0.60%, display, after twisting, a tensile strength of 189 kfg/mm$^2$. By comparing this result with the results obtained with example T, it can be concluded that there is a further gain of 34% over the tensile strength values of the strands from use of 0.1% of the first of the silanes hereabove. The mixture of these two silanes permits one to obtain, on the other hand, strands or webs which can be incorporated directly with epoxy or polyester resins in order to give, in the two cases, laminations having good mechanical strength.

TABLE A

| Properties | Sizing | |
|---|---|---|
| | Control composition T with a usual binding agent: γ-amino-propyl-triethoxysilane | Composition of example 1 with an organo-silane according to the invention |
| Tensile strength in kgf/mm$^2$ | 142 | 206 |
| Tensile strength in kgf of a canvas web HG 30 chain and web (measured in chain sense in 50 mm test specimen) | 275 | 350 |
| Tensile strength in kgf/mm$^2$ of a polyester composite reenforced web HG 30 (measured according to method B of norm NF.T57105) | initial composite 110 after 24 hours in boiling water 71 | 156 97 |

EXAMPLE 2

The organo-silane used in the example 1 composition is replaced with 0.20% of a preliminary hydrolyzed organo-silane including a polyazamide type of chain. This organo-silane which bears the reference Y 5987 (Union Carbide) has the general formula (A) in which x/y=0.92; R=methoxy radical; n=2
$R_1=R_3$=ethylene radical
$R_2$=hydroxy-cyclohexyl-ethylene, the cyclohexyl radical being bonded to the nitrogen and the ethylene to the silicon atom.

The operatory conditions for hydrolysis of this silane, the preparation of the sizing and the application onto the filaments are identical to those of example 1. Strands having a dry sizing rate of 0.60% and a tensile strength

EXAMPLE 4

A sizing for strands to be used in the form of webs to reenforce organic synthetic materials such as phenolic polyester, or epoxy resins is prepared from the following components:

| | % of active materials |
|---|---|
| adhesive: plasticized polyvinyl acetate | 2.8 |
| non-plasticized poly-vinyl acetate | 0.3 |
| co-adhesive: gelatine | 0.27 |
| non-ionic lubricant with a base of | |

-continued

| | % of active materials |
|---|---|
| polyethylene glycol 300 monolaurate, polyethylene glycol 600 dioleate and monoethylene glycol dioleate | 1.5 |
| organo-silane of formula (C) with R = methoxy, n = 2, m = 3. $$CH_2=CH-\langle Y \rangle -CH_2-NH-(CH_2)_2-\overset{+}{\underset{H}{N}}H-(CH_2)_3-Si(OCH_3)_3 \; Cl^-$$ | |
| demineralized water to | 100 |

First a 10% solution is prepared in water with a mixture of the two polyvinyl acetates by adding the polyvinyl acetates, under mild agitation, to the water at 15°–20° C. In a second tank the gelatin is dispersed into water brought to around 80° C. so as to form a 10% pseudo-solution and the agitation is maintained for 30 minutes until a clear liquid is obtained. After cooling to 30° C. with the addition of cold water, the pH is brought to 5.

Elsewhere, the hydrolysis of the silane is brought about as described previously by introducing the silane into water at pH=4 in a concentration below 3%.

The final mixture is formed by adding together the dispersed gelatin, the polyvinyl acetates in solution, the preliminarily diluted 10% lubricant and the hydrolyzed silane. It is complemented with water in order to bring it to the correct volume and if necessary, the pH is adjusted to a 4.7 value.

The final composition presents a dry extract of 4.4%.

This sizing is applied at 23° C. during fiberization to 9 μm and 13 μm filaments.

The strands obtained have a dry sizing rate of 0.80%. Measurements of the tensile strengths of the twisted strands show values of 204 kgf/mm².

CONTROL EXAMPLE T'

Strands fabricated under the same conditions with this same sizing formula, in which the organo-silane is replaced by an equal quantity of α-aminopropyltriethoxysilane, have a tensile strength of 142 kfg/mm².

Thus an improvement of 44% in the tensile strength of the strands is noted as compared with strands sized with the composition of example T', incorporating the currently used silane. There is an improvement in the capability of the strands to withstand textile transformations with the strands obtained with the sizing containing the silane of general formula (C) from example 4. The webs incorporated directly with the phenolic or polyester epoxy resins lead to laminations in which the glass-resin adhesion is at least as good as with example T'.

EXAMPLE 5

Example 4 is repeated by replacing the silane with 0.20% of an organo-silane of formula (B) in which R=methoxy, n=2, m=3.

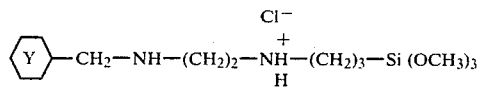

Strands are obtained which have a 0.80% dry sizing rate and which, after being submitted to a first twisting of 20 or 40 turns per meter, having a tensile strength of 188 kfg/mm². This value corresponds to a gain of 33% as compared with the tensile strengths of the strands sized with the composition of example T', containing α-aminopropyl-triethoxysilane.

EXAMPLE 6

A sizing is prepared in order to form strands with a base of 14 μm filaments used for the reenforcement by a filament winding technique of organic matrices with a polyester and epoxy resin base.

This sizing has the following composition:

| | % of active materials |
|---|---|
| bisphenol polyester resin (ATLAC 387) n = 35,000 cPo at 25° C. specific weight = 1.5 | 0.3 |
| non-modified epoxy resin (ARALDITE CY 207) | 0.9 |
| polyvinylpyrolidone η = 50 at 70 cPo at 20° C. in 4% solution | 0.9 |
| non-ionic surface-active component with alkylphenol polyethoxyether base | 0.1 |
| epoxy resin with a base of bisphenol A and epichlorhydrine (epoxy index 1.60 Eq/kg) of which 50% of the oxirannes have reacted with the diethanolamine in the presence of ethylene glycol monomethylic ether | 0.25 |
| organo-silane of formula (C) with R = methoxy, n = 2 m = 3: $$CH_2=CH-\langle Y \rangle -CH_2-NH-(CH_2)_2-\overset{+}{\underset{H}{N}}H-(CH_2)_3-Si(OCH_3)_3 \; Cl^-$$ | 0.25 |
| demineralized water to | 100 |

The non-modified epoxy resin is first melted at 80° C. then brought to 100° C. The polyester and a portion of the surface-active component (about 70%) is added to it and a strong agitation is maintained until a complete dissolution of the surfactant is complete. Then the remainder of the preliminarily dissolved surfactant is incorporated with demineralized water brought to 75° C.

The polyvinylpyrolidone in a 10% solution in water is then introduced slowly into the preceding mixture and everything is homogenized for 15 minutes, then cooled. The agitation is continued in the tank along with passage through a pressure pump until the temperature stabilizes at around 45° C.

The emulsion thus obtained has a dry extract of 50%. The emulsion is diluted with the addition of twice its weight of demineralized water at 15° C.

In another tank the organo-silane is hydrolyzed, by being introduced into demineralized water at 15° C. brought to pH=4 by lactic acid, in such a way so as to form a solution with a concentration below 3%. The agitation is maintained after the end of the hydrolysis in order to obtain a perfectly clear solution.

The hydrolyzed organo-silane is then incorporated with the resin emulsion contained in the first tank and the pH is adjusted to 4 by lactic acid before the introduction of the epoxy resin modified by diethanolamine. After the addition of this resin, the pH is brought to 3.7 if there is need and the remainder of the water is added.

This sizing, maintained at a temperature of 20° C., has a dry extract of 2.70% determined by evaporation in an oven at 105° C. for 4 hours.

The sizing is applied at a temperature of 23° C. to 14 μm filaments. A strand is obtained which has a dry sizing rate of 0.40% of its weight and which displays a tensile strength of 204 kfg/mm².

CONTROL EXAMPLE T″

Following the same method a control sizing is prepared formed from the same basic constituents in identical proportions, but the organo-silane is replaced with 0.25% of a binding agent usually incorporated in these compositions, that is α-methacryloxypropyl-trimethoxysilane. The 14 μm filaments coated with this sizing at a temperature of 23° C. produce strands whose dry sizing rates are 0.42%, while the tensile strengths are risen to 140 kfg/mm².

The results obtained with the strands coated with the composition using the organo-silane from example 6 are clearly superior to those of T″; the comparison of the tensile strength values in fact shows a gain of 46%.

The gathered parallel strands have in addition a shiny and better appearance than the products sized with the usual composition T″ due to the absence of broken filaments and due to their good adhesion to the thermoset polyester or phenolic epoxy resins.

EXAMPLE 7

By replacing the organo-silane from example 6 with 0.25% of organo-silane of formula (B) with R=methoxy, n=2, m=3;

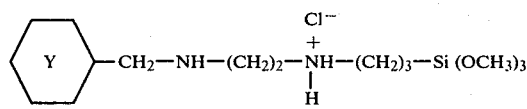

equivalent results are obtained; however, the composition formed is more particularly adaptable to reenforcing epoxy resins.

What is claimed is:

1. Aqueous sizing for coating glass fibers to be used for reenforcing thermoplastic and/or thermoset resins, characterized in that it comprises:
   0.5 to 15% by weight of at least one adhesive agent,
   0.1 to 2% by weight of at least one organo-silane of the formulas, $$H-[NH-(CH_2)_n-NH-R_1-CO]_x- \quad (A)$$
$$-[NH-(CH_2)_n-\underset{\underset{Si(R)_3}{\overset{R_2}{|}}}{N}-R_3-CO]_y-NH-(CH_2)_n-NH_2$$

in which
   x/y is 0.5 to 15; n is 2 to 6; R is methoxy, ethoxy, propoxy, n-butoxy or β-methoxyethoxy radical,
   R₁ and R₃ are divalent alkylene radicals containing 1 to 3 carbon atoms, and
   R₂ represents a substituted or non-substituted divalent cycloaliphatic, aromatic or aliphatic radical,

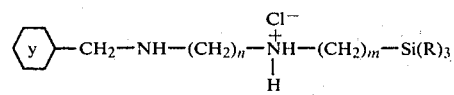
(B)

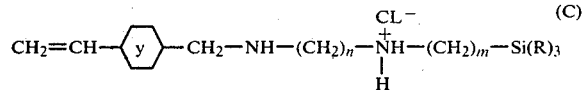
(C)

in which n is 2 to 6; m is 1 to 10
   R is a methoxy, ethoxy, propoxy, n-butoxy or β-methoxyethoxy radical,
   0 to 7% by weight of lubricant(s), and
   0 to 2% by weight of an organic glass-resin binding agent.

2. Aqueous sizing for coating glass fibers to be used to reenforce thermoplastic and/or thermoset resins according to claim 1, characterized in that it comprises:
   1 to 10% by weight as an adhesive agent of an acrylic polymer, a polyvinyl acetate, an epoxy resin, a polyester resin, or a polyurethane,
   0.5 to 5% by weight of non-ionic lubricant(s), and
   0.1 to 2% by weight of at least one organo-silane of the general formula A.

3. Aqueous sizing for coating glass fibers to be used for reinforcing thermoplastic and/or thermoset resins according to claim 1, characterized in that it comprises:
   1 to 10% by weight of at least one adhesive agent such as an acrylic polymer, a polyvinyl acetate, an epoxy resin, a polyesyter resin or a polyurethane,
   0.05 to 5% by weight of non-ionic lubricant(s),
   0.1 to 2% by weight of at least one organo-silane of the general formulas B and C.

4. Aqueous sizing for glass fibers to be used for reenforcing plastic materials according to claim 1, characterized in that it contains at the most up to 3% of a co-adhesive such as gelatin, up to 5% of at least one cationic lubricant, and up to 2% of an organic glass-resin binding agent such as another organo-silane.

5. Aqueous sizing according to claim 1, characterized in that one of the amine groups of the organo-silane is in the form of hydrochlorate.

6. Aqueous sizing according to claim 1, characterized in that it contains at least one of the organo-silanes with the general formulas:

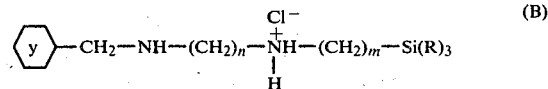
(B)

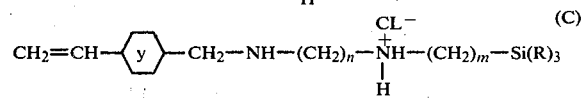
(C)

in which:
   n is 2 to 6, m is 1 to 10 and
   R is a methoxy, ethoxy, propoxy, n-butoxy or β-methoxyethoxy radical.

7. Aqueous sizing for coating glass fibers according to claim 1, characterized in that it contains at least one of the following formulas:

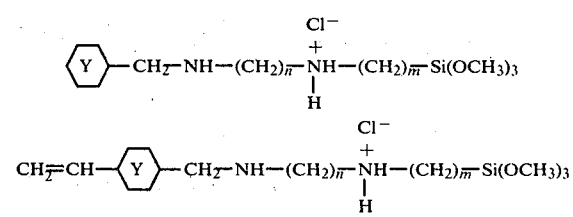

in which n=2 or 3 and m is 1 to 4, preferably with n=2 and m=3.

* * * * *

UNITED STATES PATENT AND TRADEMARK OFFICE
CERTIFICATE OF CORRECTION

Page 1 of 3

PATENT NO. : 4,246,145

DATED : January 20, 1981

INVENTOR(S) : Jacques Molinier, Jacques Mahler, Gilbert Bocquet and Bernard de Massey It is certified that error appears in the above—identified patent and that said Letters Patent is hereby corrected as shown below:

Column 1, line 43, after "obtained" start new paragraph

Column 2, line 7, for "transformations" read --transformation--

Column 2, line 28, for "$\alpha$" (alpha) read "$\gamma$" (gamma)

Column 2, line 29, for "$\alpha$" (alpha) read "$\gamma$" (gamma)

Column 2, line 64, for "$\alpha$" (alpha) read "$\gamma$" (gamma)

Column 3, line 54, for "Y" read --$\phi$-- (phi)

Column 3, line 58, for "Y" read --$\phi$-- (phi)

Column 3, line 66, after "of" insert --the--

Column 5, line 29, for "mixture" read --matrix--

Column 6, line 19, for "Y" read --$\phi$-- (phi)

Column 7, line 3, for "$\alpha$" (alpha) read --$\gamma$-- (gamma)

Column 7, line 56, for "preliminary" read --preliminarily--

Column 8, line 18, for "Y" read --$\phi$-- (phi)

Column 8, line 21, for "$\alpha$" (alpha) read --$\gamma$-- (gamma)

Column 9, line 10, for "Y" read --$\phi$-- (phi)

Column 9, line 42, for "$\alpha$" (alpha) read --$\gamma$-- (gamma)

Column 9, line 64, for "Y" read --$\phi$-- (phi)

UNITED STATES PATENT AND TRADEMARK OFFICE
CERTIFICATE OF CORRECTION

PATENT NO. : 4,246,145

DATED : January 20, 1981

INVENTOR(S) : Jacques Molinier, Jacques Mahler, Gilbert Bocquet and Bernard de Massey.

It is certified that error appears in the above—identified patent and that said Letters Patent is hereby corrected as shown below:

Column 10, line 4, for "$\alpha$" (alpha) read -- $\gamma$ -- (gamma)

Column 10, line 34, for "Y" read -- $\varphi$ -- (phi)

Column 11, line 14, for "$\alpha$" (alpha) read -- $\gamma$ -- (gamma)

Column 11, line 36, for "Y", read -- $\varphi$ -- (phi)

Claim 1, line 19
(Column 11, line 66) for "y", read -- $\varphi$ -- (phi)

Claim 1, line 21
(Column 12, line 3), for "CL", read --Cl--

Claim 1, line 22
(Column 12, line 4), for "y", read -- $\varphi$ -- (phi)

Claim 6, line 5
(Column 12, line 43), for "y" read -- $\varphi$ -- (phi)

Claim 6, line 7
(Column 12, line 45), for "CL", read --Cl--

Claim 6, line 8
(Column 12, line 46), for "y" read -- $\varphi$ -- (phi)

UNITED STATES PATENT AND TRADEMARK OFFICE
CERTIFICATE OF CORRECTION

PATENT NO. : 4,246,145

DATED : January 20, 1981

INVENTOR(S) : Jacques Molinier, Jacques Mahler, Gilbert Bocquet and Bernard de Massey It is certified that error appears in the above—identified patent and that said Letters Patent is hereby corrected as shown below:

Claim 7, line 5
(Column 12, line 59), for "Y", read -- $\varphi$ -- (phi)

Claim 7, line 8
(Column 12, line 63), for "Y" read -- $\varphi$ -- (phi)

Signed and Sealed this

Twelfth Day of May 1981

[SEAL]

Attest:

RENE D. TEGTMEYER

Attesting Officer

Acting Commissioner of Patents and Trademarks